US005587862A

United States Patent [19]

Frank, Sr.

[11] Patent Number: 5,587,862

[45] Date of Patent: Dec. 24, 1996

[54] GROUND FAULT INTERRUPTER BUCKET COMBINATION

[76] Inventor: William D. Frank, Sr., P.O. Box 81, Long Plains Rd., West Buxton, Me. 04093

[21] Appl. No.: 501,943

[22] Filed: Jul. 13, 1995

[51] Int. Cl.[6] .......... H02H 3/00

[52] U.S. Cl. .......... 361/42; 361/57

[58] Field of Search .......... 361/42, 44, 45, 361/49, 50, 57, 601, 625, 641, 673

[56] References Cited

U.S. PATENT DOCUMENTS

| | | | |
|---|---|---|---|
| 3,066,217 | 11/1962 | McDonald | 206/702 |
| 3,733,478 | 5/1973 | Barker | 362/387 |
| 3,753,047 | 8/1973 | Shallbetter | 174/60 |
| 3,872,354 | 3/1975 | Nestor et al. | 361/42 |
| 4,709,980 | 12/1987 | Coll et al. | 174/37 |
| 4,730,855 | 3/1988 | Pelletier | 174/71 R |
| 4,861,050 | 8/1989 | Bergeron | 280/47.35 |
| 4,872,087 | 10/1989 | Brant | 361/45 |
| 4,984,685 | 1/1991 | Douglas | 206/334 |
| 5,217,298 | 6/1993 | Jackson et al. | 362/226 |

*Primary Examiner*—Jeffrey A. Gaffin
*Assistant Examiner*—Ronald W. Leja
*Attorney, Agent, or Firm*—Stan Jones, Patents

[57] ABSTRACT

A Ground Fault Interrupter ("GFI") combined with a plug-receiving receptacle is mounted on a plastic bucket. The bucket is additionally configured with a weathertight opening through which a three prong male end of a pigtail electrically connected to the GFI/receptacle unit may pass. A resealable lid provides a weathertight covering for the bucket so that the combination is functional during field use or for final storage for user transport of tools and other electrical apparatus. The device is optionally configured with a removable, storable, pedestal pole-mounted light assembly. A pedestal light support flange is attached to the interior base of the bucket, and container-sized pole sections substantially the same interior clearance height of the container are available for assembling the light pole when needed by a user. The light is powered by the GFI/receptacle unit carried by the bucket.

30 Claims, 5 Drawing Sheets

GROUND FAULT INTERRUPTER BUCKET COMBINATION

BACKGROUND OF THE INVENTION

1. Field of the Invention

The field of invention includes electrical safety apparatus in combination with a container. More particularly, the field involves lighting apparatus, electrical power extensions, and electrical shock protection devices which are self-containerized for portability, safety and field use. Such devices are in compliance with most State and Federal Rules and Regulations including those of the Office of Safety and Health Administration ("OSHA").

2. Definition/Explanation of Terms

Ground Fault Interrupter (GFI). The term Ground Fault Interrupter is a shortened version of the original, longer, more descriptive terminology, Ground Fault Circuit Interrupter (GFCI). Both terms and acronyms are used interchangeably. Such a device is electrically in series with a power source and any given portable tool which a user may plug into a female receptacle incorporated with a GFI.

The purpose of the ground fault interrupter is to protect a user by preventing electrical shock from portable tools and power equipment. A GFI device performs its safety function by sensing minute stray currents (on the order of 4 to 6 milli-amps) which may be attempting to reach earth ground through a human's body.

These very small initial currents flowing to ground and detected by the GFI provide a near instantaneous circuit breaker which interrupts the primary electrical current from the power source. This detection occurs within approximately 1/30th of a second before higher, more dangerous current levels can build up, thus preventing electrical shock, reducing fire hazards and creating a safer work place.

Receptacle. An electrical receptacle is one or more female receivers usually of the three prong variety. They are also normally configured in pairs or multiple ganged pairs. GFI circuitry is incorporated internally and is electrically in series with the internal and external connectors in a housing for the receptacle. This configuration thereby creates an integral circuit interrupter and connection apparatus housed along with the receptacle.

Self-Containment. A plastic containment bucket assembly is a preferred form for self containing the electrical apparatus of the invention. Such a bucket provides a structural mounting apparatus and a weathertight container for housing for the GFI/receptacle unit of the invention.

External Source of Potential. In electrical terms, potential is defined as the potential to do work. It is the electrical potential above earth ground—usually measured in volts. For purposes of this self-contained invention the potential source, or primary source, is located externally, and the invention includes a safe, easy and OSHA accepted way of connecting to such a primary source.

Ground. Ground is defined electrically as zero potential and is used interchangeably with earth ground. Grounding is the act of connecting a device, wire or object electrically to a portion of a circuit which is then physically in contact with the earth usually through a conductive rod driven into the ground.

Weathertight Container. While the self-contained electrical apparatus of this invention is not absolutely waterproof in use, it is essentially so with normal care and usage. Thus, mounted electrical apparatus in combination with an easy ingress/egress container meets weathertight standards in that conventional hinged covers, lids and sealable gaskets are provided for the electrical apparatus. Moreover, the container has easy ingress/egress and is readily resealable by an open/close lid for convenient daily use by a user.

3. Description of the Prior Art

As we have progressed in our technological development, we have created more uses for tools which use electricity at temporary sites. With this proliferation, concerns for electrical safety at the job site have dramatically increased. The first major thrust into this safety area was the U.S. Electrical code requirement of a separate, third ground wire for electrically supplied power.

The next, and still current addition in the safety area of prevention of electrical shock is that of a Ground Fault Interrupter (GFI). This GFI device has become an industry standard for electrical shock protection when using portable tools. Safety has become so critical that such devices are mandated by OSHA.

GFI units are separately packaged devices between a primary power source and portable power tools. Although fine for shock protection, the nature of construction sites poses a major electrical hazards and housekeeping problems associated with GFI assemblies. Such assemblies, in the past, were thrown on the floor, tacked or tied to temporary construction members. And, in many instances, were susceptible to misuse and damage. Often, GFI units are dragged through, or left in dangerous areas, such as those where water has pooled, thus endangering the lives and safety of workers.

Turning now to the prior art, a search has turned up various patents, many of which are only of peripheral relevance to this invention. Such patents include, for example, U.S. Pat. No. 3,872,354 (Nestor et al, 1975). Circuitry such as disclosed in Nestor et al is incorporated in today's commercial GFIs. Nestor discloses one typical technique and circuitry for a primary circuit interruption with fast response.

U.S. Pat. No. 4,709,980 (Coll et al; 1987) is of limited relevance to the present invention. The Coll invention is specifically engineered for cable splicing of joined, contained, and underground cables. It is not designed for repeated, daily use. Its purpose is to receive a properly spliced underground cable and permanently store the same. It is not relevant in structure or function to the invention.

U.S. Pat. No. 5,217,298 (Jackson et al., 1993) and U.S. Pat. No. 3,066,217 (McDonald, 1962) are lighting only container devices and are unrelated to the portability and safety features of my invention. They have no relation to OSHA requirements nor safety considerations for portable electrical equipment at job sites.

U.S. Pat. No. 4,984,685 (Douglas, 1991) suggests the use of a plastic bucket for storing and removing an electrical extension cord and cord light in a specific retrievable manner. While Douglas does show the usage of a bucket as a container for such storage it does not disclose the novel features of a ground fault interrupter and bucket combination, nor the combination of the bucket as both a mounting means and weathertight storage. Moreover, Douglas does not teach or suggest a container as a light base for a pole light partially housed in the bucket nor as a weathertight container for other tools which may safely be plugged into a bucket- mounted GFI/receptacle unit.

OBJECTS OF THE INVENTION

It is an object of the invention to provide portable self-contained GFI protection to prevent electrical shock while using a receptacle mounted on a portable field use container for electrical supplies and electrically-powered tools.

It is an object of the invention to maintain a field-use GFI/receptacle in an upright, stable position on a container which may readily be connected by a weathertight connection to an external power source.

It is an object of the invention to provide safe and weathertight protection of a GFI/receptacle unit in combination with a portable weathertight container.

It is an object of the invention to provide a weathertight self-contained electrical cord and GFI/receptacle configuration which may lead to an externally located primary electrical source.

It is an object to provide an electrical cord for a weathertight GFI/receptacle assembly in a self-contained bucket for weathertight protection and daily transportation to and away from construction sites.

It is an object to provide an associated container for receiving electrical cords in combination with GFI/receptacle units so as to provide a user-friendly and safe storage for electrical tools and cords when not in use.

It is an object to provide portability of a self-contained circuit breaker, light fixture and other electrical tools or apparatus within a lightweight, easy-to-use weathertight container.

It is an object to provide an easy-carrying, self-contained combination for electrical protection circuitry and electrical tool capacity achieved within the container itself.

It is an object to provide a user installed portable pole light within a container for electrical circuit power connections for the light also safely mounted and portable by the same container.

It is an object to provide a means of creating a readily assembled extension method of removing a light and a mounting fixture from within a container, and affixing the light with safety-protected electrical circuitry provided by that same weathertight container.

It is an object of the invention to create a power extension device which may be connected to a primary source such that the extension and other associated electrical apparatus can be disconnected and stored in the container for easy portability and repeated daily usage.

It is an object of the invention to incorporate a weathertight seal when assembling a self-contained pole extension light in combination with a GFI/receptacle carried by a weathertight container and support for the light/GFI/receptacle combination.

It is an object of the invention to provide readily replaceable attachment ring and a screw-on open/close lid on a standard plastic bucket in combination with electrical safety devices associated with electrical receptacle(s) mounted on the bucket and carried in combination therewith.

It is an object of the invention to secure weathertight openings in a sidewall container for electrical safety apparatus mounted on the sidewall of the container.

It is a further object of the invention to provide electrical outlet boxes and GFI/receptacle protection on a weathertight container that is safety-protected for portable field use.

It is an object to provide a stabilizing flange in the bottom of a weathertight bucket for anchoring an easily assembled light pole carried within the bucket and powered safely by electrical connections carried by the bucket.

SUMMARY OF THE INVENTION

For purposes of this invention, a GFI/container assembly includes one or more electrical receptacles with an internal ground fault interrupter, and an industry standard electrical box with weathertight cover mounted on a container's supporting surface. Such an assembly has an insulated, sheathed electrical pigtail extension electrically hard wired to a GFI-protected receptacle and a loose, or unwired end of, the pigtail extension which is affixed with a male plug—normally of the male three prong type.

One or more GFI/receptacle assemblies, in accordance with good electrical safety practices, are rigidly mounted relative to the outside exterior of a portable bucket so that a weathertight opening for exposing the receptacle face is available at the bucket's exterior. The invention provides a pigtail type GFI assembly with a loose male plug inside the bucket for user-initiate connection to a primary source. That pigtail may readily be joined with a primary power source by connection thereto through another weathertight protective opening in the bucket. Thus, the weathertight power supply opening in the bucket allows the completed power connection to be temporarily stored in the container away from inclement weather and water on a job site.

The GFI and bucket combination solves several field problems in a number of ways. First, the bucket/GFI assembly configuration provides a safe and secure, permanent but portable mounting for a tool-receiving receptacle end of the GFI/receptacle assembly. Secondly, it provides strain relief and safety for the pigtail portion of the assembly. Thirdly, it positions the receptacle end in its preferred, vertical configuration thereby orienting weathertight plugs within weathertight-capped housings located above the construction site floor during workmen's usage. And a corresponding orthogonally located weathertight-capped opening provides entrance and egress for the male end of a pigtail extension that is hard wired to the GFI assembly for connection to a primary power source.

Additionally, a resealable lid provides a simple, easily operable and weathertight covering for the bucket so that the combination is functional during field use of the invention or for final storage for user transport of tools and an electrically safe portable power availability in the container for easy transport to and away from the job.

Lastly, the device is optionally configured with a removable, storable, pedestal pole-mounted light assembly. A pedestal light support flange is securely and permanently attached to the interior base of the bucket. Container-sized pole sections substantially the same as or slightly less than the interior height of the container are available for assembling the light pole when needed by a user. For example, I have found that several light pole sections each with anti-seize rings can readily be stored within my container and then screwed together as needed for erecting a pole that will hold a light fixture for use on the job site.

By making the light pole section separate from each other, the erected pole is both strong and secure for an adjustable construction light. In particular 1 have found that three light pole sections provide, for a standard sized plastic pail a light pole of about three to four feet above the floor surface. Such a height is particularly useful when working in early or late hours and may readily be assembled and disassembled as needed for day to day operations. Further, the point at which the light pole exits the lid is also sealed in a weathertight manner—preferably by the same O-ring seal that is located at the upper end of the first interior light pole section threaded into a base located within the pail.

DESCRIPTION OF PREFERRED EMBODIMENT(S)

Figure 1:
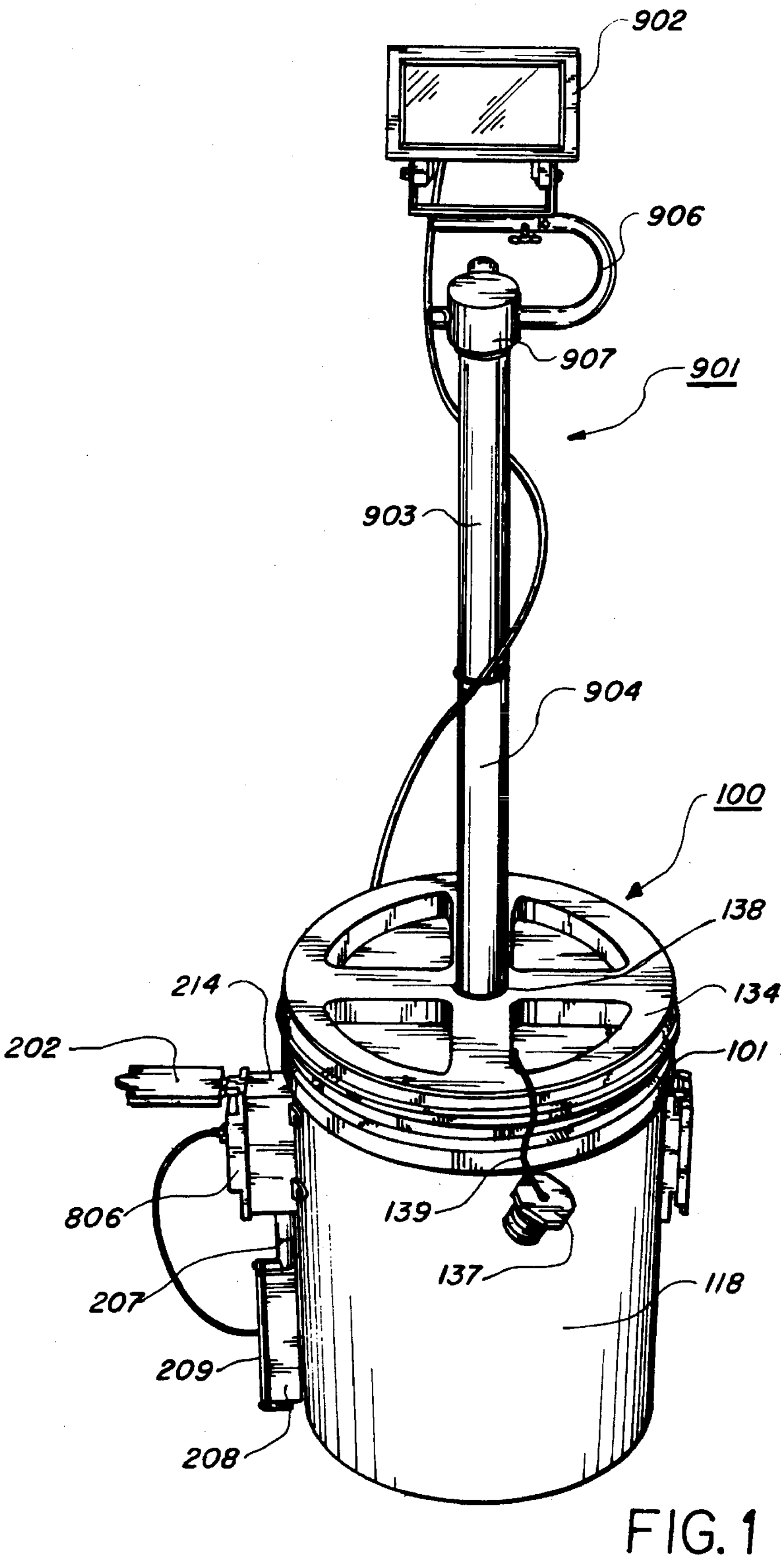
FIG. 1 is a front perspective view of the GFI/receptacle bucket combination depicting an optional light stand.
Figure 2:
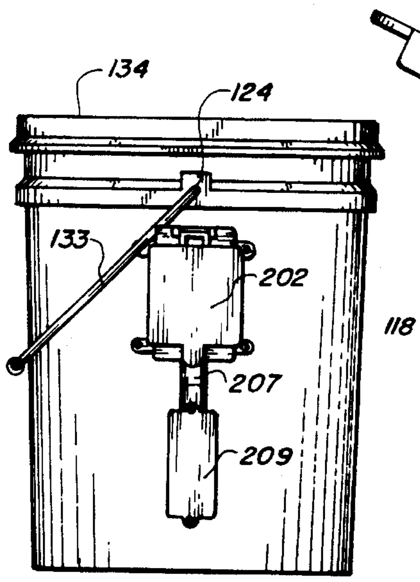
FIG. 2 is a front view of the GFI/receptacle bucket combination with a rain shield closed.

Turning now to FIG. 1, a perspective view of one embodiment of the invention is shown. The GFI intermediate power source combination 100 is comprised of a rigid plastic container 101 having a circular opening covered by an open/close lid 134. This top opening is normally in the order of 12 inches in diameter for most standard plastic five gallon pails.

Rigid plastic container 101 is further comprised of continuous sidewalls 118 extending peripherally downward from the top opening covered by lid 134. The downward extension of the near vertical, circular sidewall 118 is in the range of 12 to 24 inches and terminates structurally with a closed bottom wall. Standard plastic buckets are available in 3.5, 5 and 7 gallon sizes.

Rigid plastic container 101 is made weathertight at the top opening by a screw-in reusable, sealable lid 134. Although any number of lid configurations may be used, the one chosen for this application is a lid and ring combination designed specifically to fit the 12 inch diameter industry standard plastic buckets of the 3.5, 5, and 7 gallon variety.

Positioned on the outer vertical sides 118 of container 101, are various electrical housings, covers and conduits as required for the GFI/receptacle feature of the invention. For example, electrical box 214 surrounds and holds a GFI/receptacle unit. Electrical box 214 is typical of any number of such boxes which may be mounted on container 101. In keeping with U.S. Electrical Codes and guidelines, electrical box 214 is configured with a short conduit connector 207 exiting from the lower portion of electrical box 214. This conduit connector 207 protrudes downward and connects to a mating U.S. Code elbow access box 208 having a removable inspection cover 209.

Figure 3:
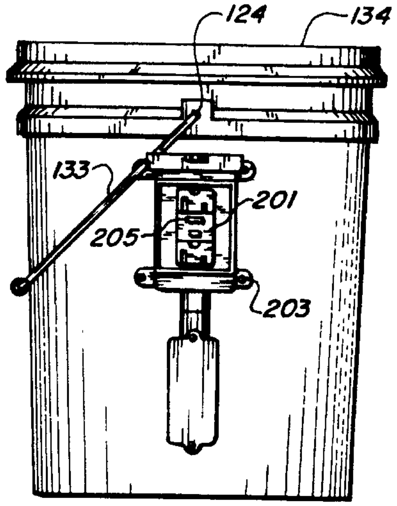
FIG. 3 is a front view with the GFI/receptacle rain shield open.

FIG. 1 also shows a rain shield 202 affixed to a cover 806, which cover is screwed into the face of electrical box 214. Shield 202 is hinged at the top to cover 806. Box 214, as shown in FIGS. 1 through 4 houses the GFI/receptacle 201. This GFI/receptacle unit may be of the one or multiple receptacle configurations. FIG. 3 depicts a typical duplex receptacle 201 which may receive two separate male plugs in standard fashion.

GFI/receptacle 201, FIG. 3, is normally encapsulated in a synthetic plastic material. Both receptacle openings are protected by one GFI circuit 212, FIG. 4. The circuit 212 is also normally encapsulated within the material that forms the duplex receptacle 201. Receptacle 201 additionally incorporates a circuit reset button 205. In the presence of a short or transient current, GFI 212 breaks the primary circuit in the manner described earlier. Once this condition is corrected, reset button 205, FIGS. 3 and 4, will restore electrical continuity for receptacle 201. Further, such industry standard GFI's also contain a test button 213 that allows a user to test the circuit breaking capability of the GFI.

GFI/receptacle 201 is mounted into and surrounded by a standard, weathertight electrical box 214. Box 214 is provided with mounting ears 203 containing pre-drilled or pre-cast mounting holes 204. Electrical box 214 is affixed to an upright sidewall 118 of container 101 with bolts 509 and nuts 510 through mounting holes drilled through the sidewalls 118 of container 101 at appropriate locations. Acorn nut-type fasteners provide a smooth non-snagging interior surface for the invention.

The location for mounting electrical box 214, FIG. 3, is such that its central vertical axis is beneath, but in line with handle mounting holes 124. These mounting holes may receive any standard handle 133. Additionally, box 214 is mounted a distance sufficiently below the mounting holes 124 so that the handle 133 clears the attached electrical box 214, when that cover is at rest. (Please note that the hinged rain shield 202 in FIG. 3 is toward the front and away from handle 133.)

Figure 4:
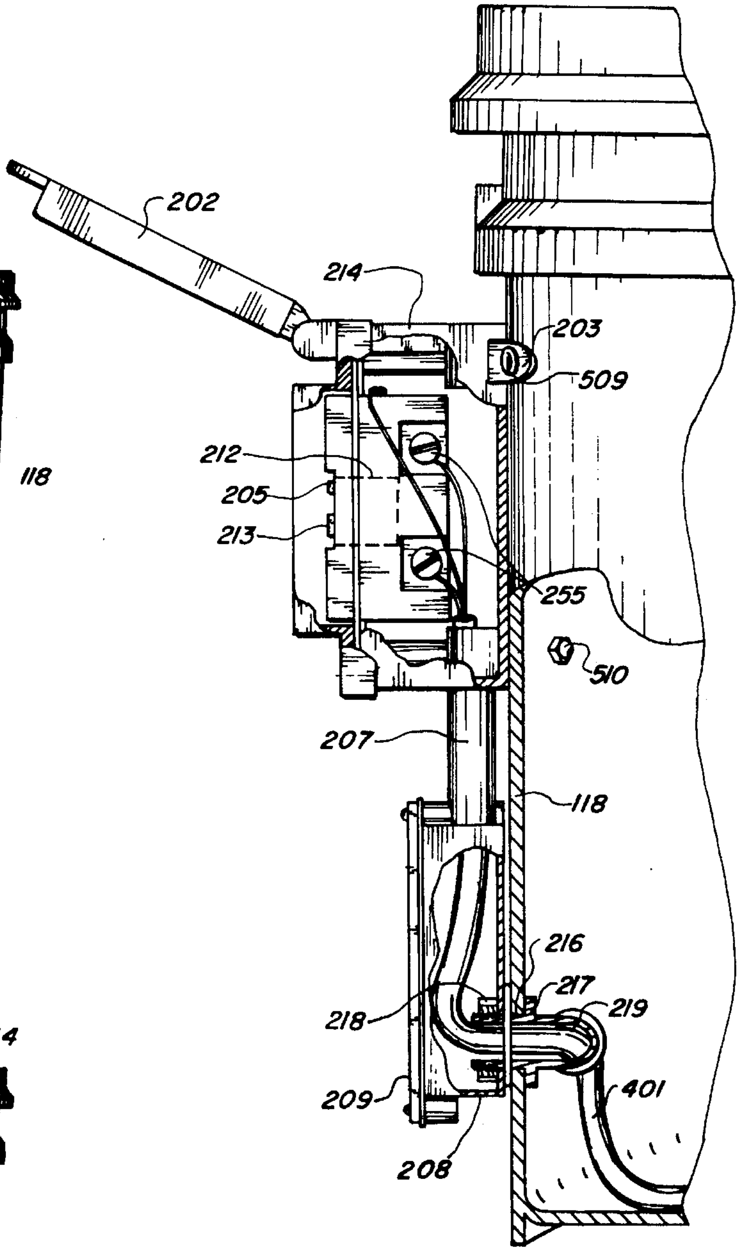
FIG. 4 is a partial cut-away side view of a receptacle/GFI unit of the invention.

The combination of box 214, conduit stub 207, and elbow access box 208 is shown in partial cross section in FIG. 4. These elements create a protective covering for a three conductor electrical wire 401. Wire 401 is optionally stored in bucket 101 and may have a standard three prong male plug 402, FIGS. 5 and 6, hard wired at one end and stripped wire for hard wired connection to electrical terminals at the other end as more clearly shown in FIG. 4.

As shown in FIG. 4, near the bottom of bucket 101, a wire hole 216 is cut through sidewall 118. Positioned within hole 216 is an L-shaped conduit 219. Conduit 219 has an oversized flange and a threaded post section 217 that fits within opening 216. Flange 217 is positioned against the inside surface of sidewall 118 and the threaded post section extends beyond sidewall 118 through an opening in access elbow box 208. Box 208 is secured to the outside of container 101 by a backing nut 218. If additional weather tight connection is desired an O-ring may be used between the flange 217 and sidewall 118.

Elbow box 208 is configured with a removable inspection lid 209 for wiring access. During assembly, the stripped wire end of wire 401 is fed through elbow conduit 219, into elbow box 208 and upward through conduit stub 207 for electrical attachment at terminals 255 provided on GFI/receptacle 201, as shown in FIG. 4. For example, in FIG. 4 the stripped wire ends of wire 401 are shown connected by terminal 255 screws at three separate connection points of receptacle 201 in accordance with standard wiring practice.

Figure 7:
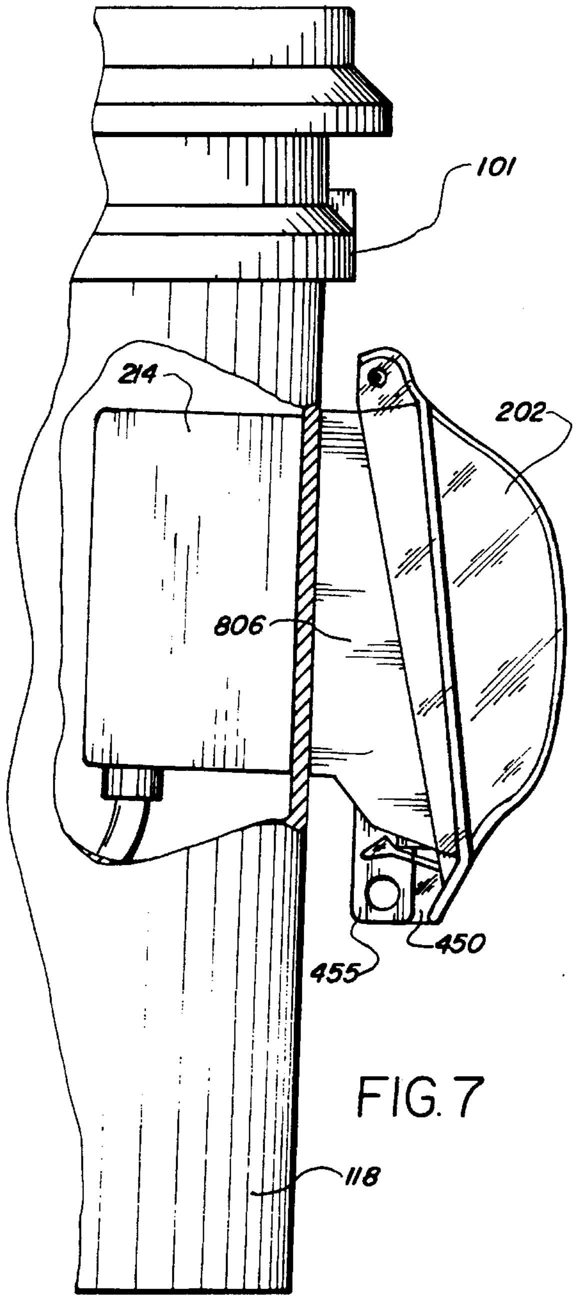
FIG. 7 is a partial side view of an alternative mounting embodiment for a GFI/receptacle unit of my invention.

It should be recognized at this point that box 214 may be of the type that has an opening in the top, bottom or rear side of the weathertight housing. One alternative method of mounting box 214 would be to do so within an enlarged opening cut through the sidewall 118 of the bucket 101 in order to receive the rearmost part of housing 214 within the interior of bucket 101. Such an alternative is shown in FIG. 7. The housing 214 may thus be mounted without an L-shaped elbow 219, conduit 207 or elbow box 208 as shown and described earlier. This form of mounting has the added advantage that it locates the center of gravity of the combination closer to the center of the bucket.

It is within the scope of this invention to mount the weathertight housing 214 completely inside the bucket, with the face of receptacle 201 exposed at the exterior surface of bucket 101 as shown in FIG. 7. In this alternative form of the invention, the receptacle face may still be covered by a rain shield 202 hinged at the exterior surface of the bucket. The rain shield 202 may be made of transparent or opaque material. If transparent, the status of the test and reset buttons 205, 213 may be determined without lifting the rain shield.

Figure 8:
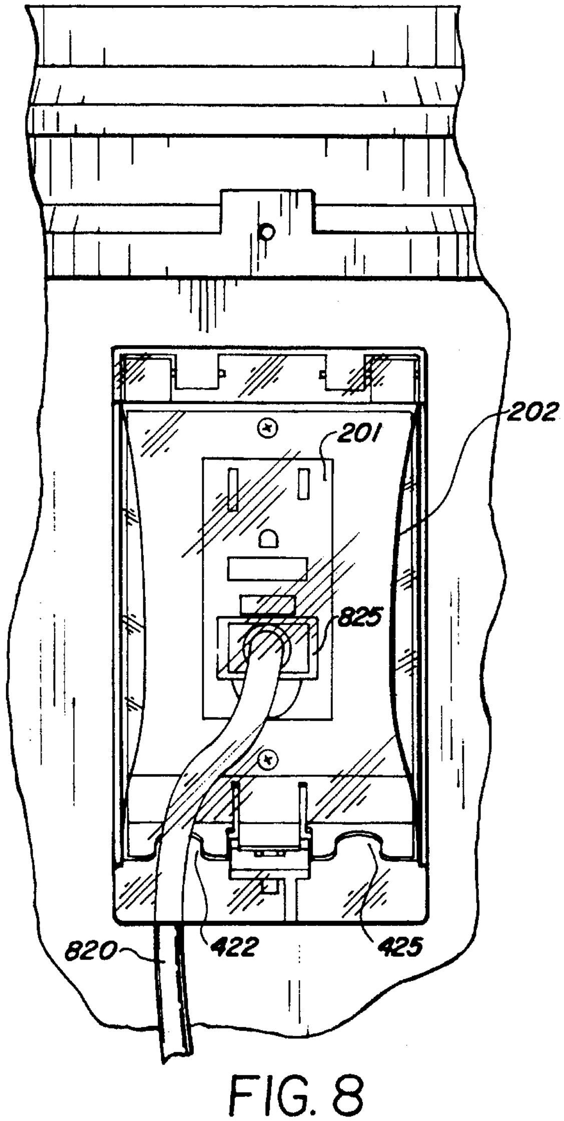
FIG. 8 is a partial front view of the alternative embodiment of FIG. 7 having a transparent rain shield with openings for electrical wiring.

Please note in FIG. 8, that the wire from a tool which has been connected to receptacle 201 may derive power from the invention of this alternative mounting form with an added advantage of improved shielding from water. For example, as shown in FIG. 8, a tool wire 820 equipped with a male plug 825 may be plugged into the receptacle 201 and the rain shield cover 202 closed over the wire and plug. The tool wire 820 may be removably seated in wire-receiving openings such as openings 422 and 425.

An overlapping pair of downward hasp extensions 450 and 455 are formed respectively in the lower part of housing cover 806 and rain shield 202, FIG. 8. Such hasp extensions may be provided with aligned openings for receiving a lock (not shown). The locking capability is of considerable interest for use of the invention around children. Also a locking cover and rain shield, as shown in FIGS. 7 and 8, may be used on the power opening side as shown in FIG. 6.

As a further alternative, the plastic bucket itself may also have integrally molded sidewall protrusions in the bucket sidewalls. Such protrusions are appropriately sized to receive the GFI/receptacle unit and/or the power opening cover unit. Such plastic protrusions may likewise be fitted with hinged rain shield covers.

Figure 5:
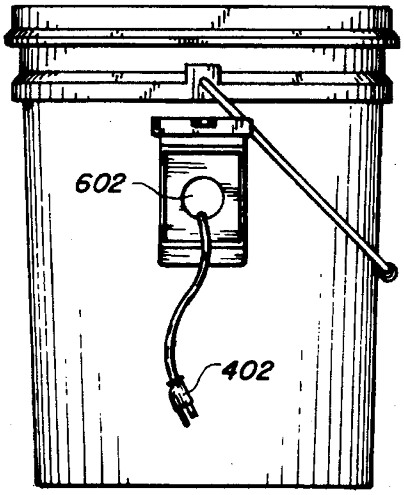
FIG. 5 is a back view showing an exit port with a rain shield open and pigtail cord partially uncoiled in order to lead leading to an external power source.
Figure 6:
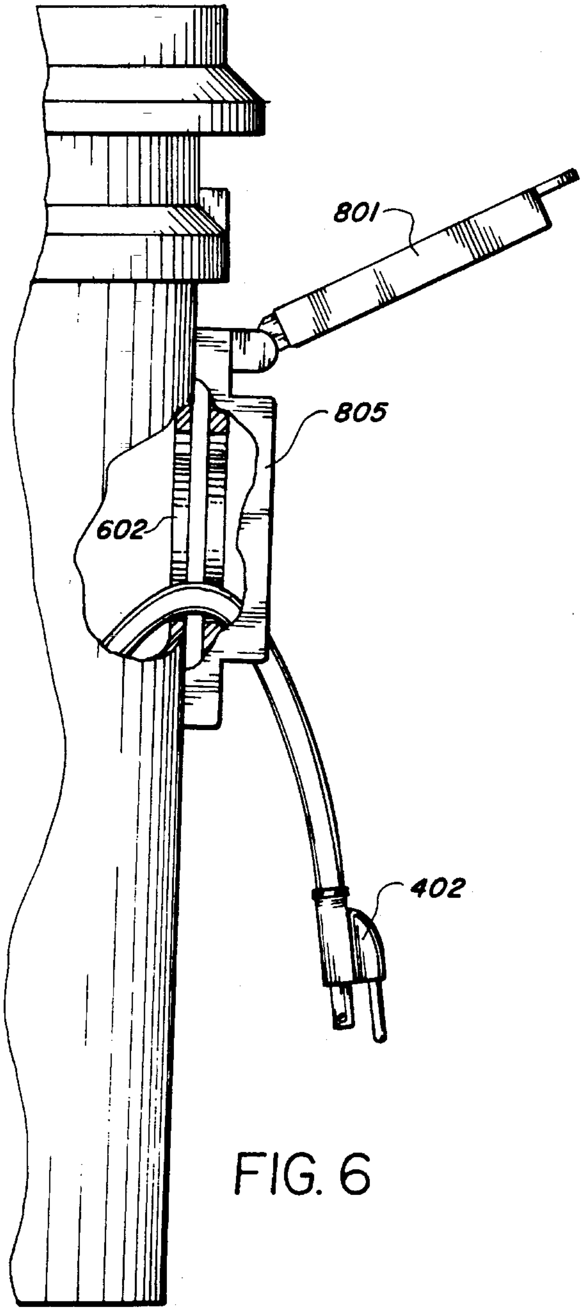
FIG. 6 is a partial cut-away side view of an exposed weathertight opening of FIG. 5.

FIGS. 5 and 6 depict a view a three prong conductor wire 401 being of sufficient length to exit plastic container 101 through hole 602 for attachment to a primary electrical source (not shown). Opening 602, for additional protection, storage, and handling, is also configured with a modified rain shield 801 and housing 805 for purposes of providing a weathertight covering for hole 602. Housing 805 and rain shield 801 may be suitably fastened to container 101 with fasteners and acorn nuts as previously described.

Power opening 602, FIGS. 5 and 6, is larger in diameter than an industry standard male/female three prong plugged connection. This large diameter opening 602 allows the user to connect plug 402 to a primary power source or to another extension cord (shown in dashed lines in FIG. 9). In the latter case mentioned above, both cords so connected may be re-inserted through opening 602 and dropped into the interior of container 101 for weathertight protection of the plugged connection as shown in simplified form in FIG. 9.

Figure 10:
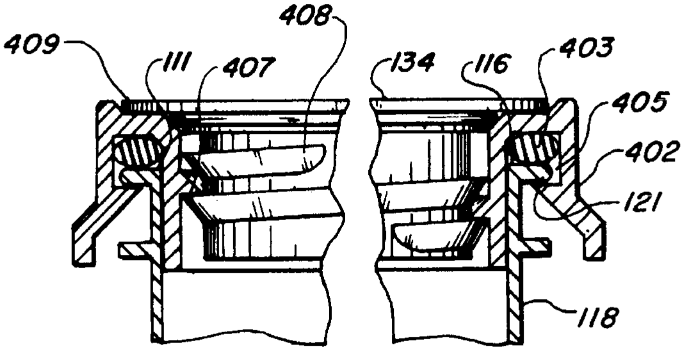
FIG. 10 is a partial cut-away of an open/close lid and assembly covering the top opening of the bucket.

Turning now to FIG. 10 an enlarged partial cutaway view shows a lid 134 covering the top opening 111 of bucket 101. Lid 134 is secured to bucket 101 through a threaded connection incorporating an after-market permanently attached ring 402. The under body of ring 402 is specifically molded with a peripherally continuous U-shaped internal groove 405. Groove 405 is of such width and cross-sectional shape so as to snap tightly over a corresponding reinforcing member 121 of rim 116, thereby compressing O-ring seal

403 tightly against the top of rim 116 creating a watertight seal between the bucket 101 and connection ring 402.

Ring 402 is configured with inwardly-directed molded raised, male threads 407, while lid 134 is configured with outwardly-directed matching molded raised, female threads 408. Further, lid 134 has an over running lip 409 which acts as a stop when lid 134 is screwed into ring 402. Lip 409 in conjunction with ring 402 forms an open/close weathertight lid and bucket assembly.

For purposes of this invention the self-containment feature for an electrical/bucket combination of the invention, may include any one of several known weathertight lids. For example, a so-called "Gamma" patented plastic lid and ring assembly in accordance with U.S. Pat. No. 5,207,345 may be particularly useful as a top cover. Either new or used buckets may be employed for the invention, and a Gamma or Gamma-type lid is a suitable replacement for the one-time shipping lid for plastic buckets previously shipped with some form of containment.

Sealed shipping lids must be cut away in order to access the contents of the buckets used for such shipping. Generally speaking such a lid is a one time, for shipping purposes only, containment lid. The bucket itself, of course, is not harmed and thus is a continually useful device that most users have in their home, business or work place. Such buckets, affixed with my GFI/receptacle invention, serve a new and novel purpose not heretofore realized by the art. In any event, the purpose of the lid and ring assembly is to provide a weathertight reusable lid covering the top opening 111 of bucket 101.

Returning briefly to FIG. 1 another feature of my invention is shown for providing a portable light and GFI/receptacle connection for standard 120 volt operation. This portable light feature, is provided by light 901 which is plugged into the GFI/receptacle 201. Such a light, supplied with my GFI/receptacle protection, thus complies with OSHA requirements.

Figure 9:
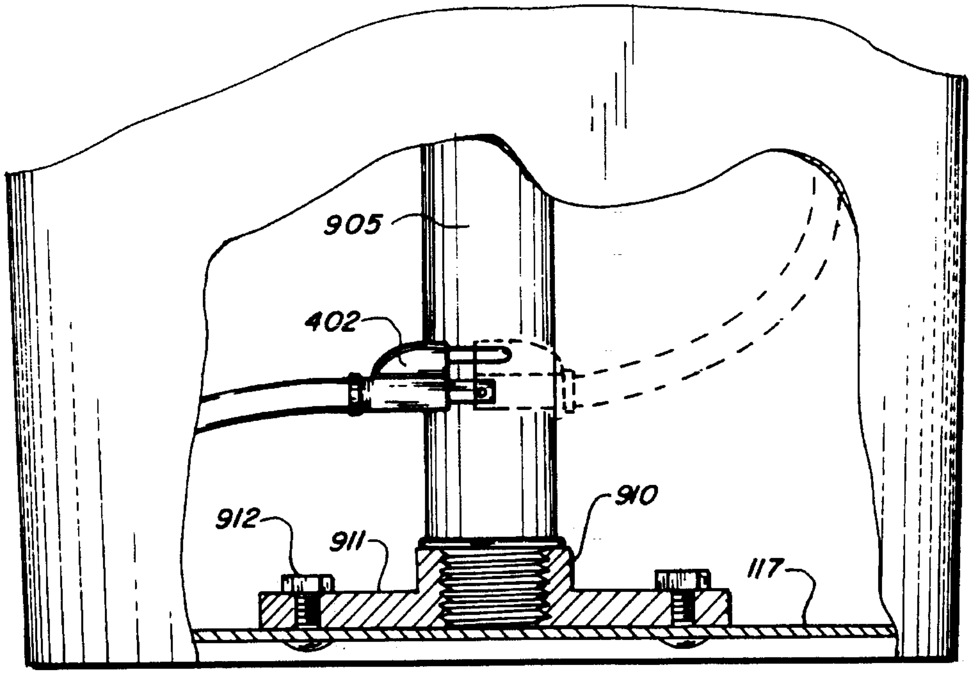
FIG. 9 is a partial cut-away of a light flange in the bottom of the bucket.

As shown in FIG. 9, pole section 905 extends to the bottom of bucket 101 through a hole 138 in lid 134, FIG. 1. Placed in the bottom of bucket 101, is a pedestal flange 910, FIG. 9, which flange is secured to bottom 117 of bucket 101 with carriage bolts 911 and nuts 912. Of course, this pedestal light support flange 910 may be securely attached to the bottom 117 of the bucket by any other suitable means or it may be molded directly into the bucket itself.

The first pole extension 905 at its upper end is configured with an O-ring seal to seal the point 138 at which the first pole section 905 exits the lid to join with a second section 904. Sectioned pole light 901 may be carried in a disassembled condition to the job site in container 101 and then assembled as needed at the site. The various light components may include a light pole made up of three to five interchangeable pole sections of equal length. The length for each section is chosen to fit within the container so that they are easily disassembled or reassembled at the job site as needed.

Sealable lid 134 is further configured with sealable screw plug 137. Screw plug 137 is attached to the sealable lid 134 with a linking chain 139. This cap 137 seals the center opening 138 in lid 134 when the pole is disassembled for weathertight storage and portability. When light pole 905 is not in use, screw plug 137 is secured in lid 134 such that the entire GFI combination 100 retains its watertight integrity.

The pole sections 903, 904 and 905 may be made of PVC piping and are each adapted with threaded fittings that screw together to make a light extension/mounting pole 905.

O-rings separate each section and provide a cushion for both secure mounting purposes and to prevent the PVC pipe sections from binding against themselves when the sections are threaded together.

Figure 11:
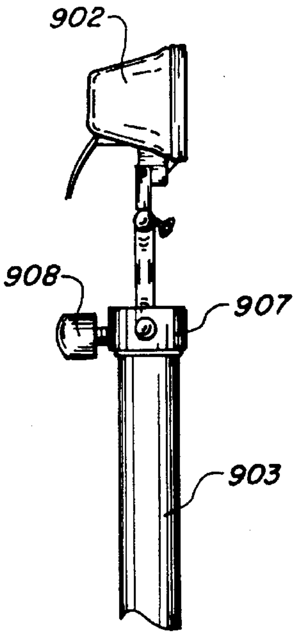
FIG. 11 is side view showing a pole extension and light bracket assembly.

Included at the upper end of longitudinal pole 903 is a top cap 907, which cap has a transverse opening therethrough for slidably receiving a C-shaped light bracket 906. Bracket 906 holds a light 902 on one side of the C-shape, while the other side of bracket 906 slides through the opening in top cap 907. Bracket 906 may be adjusted as desired for lighting angles and then held in place by a threaded screw-down tightening knob 908, FIG. 11.

Tightening knob 908 and the C-shaped bracket 906 allow a user considerable freedom for adjusting the lighting position for light 902. Similarly the number of sections for my light pole can be selected for any desired light height. While light 902, as shown, is of a commercially available argon type, it is obvious that any suitable light may be employed without departing from the spirit of my claimed invention.

Light pole 903 also provides a secondary benefit in that it can serve as a secondary grasping handle ("grab pole") for moving the GFI/receptacle/light/bucket combination. As a result of balance and clearance considerations, standard bucket handle 133 may be less than optimal when light 902 is installed. Experience has shown, however, that pole section 903 easily serves as a handle for moving light 902 as desired at the job site.

While my invention has been described with reference to a particular example of preferred embodiments, it is my intention to cover all modifications and equivalents within the scope of the following claims. It is therefore requested that the following claims, which define my invention, be given a liberal interpretation which is within the spirit and scope of my contribution to this art.

What is claimed is:

1. A weathertight intermediate protective unit comprising:

a portable, side-walled, essentially empty container capable of carrying tools, power cords and other loose articles as required at job sites, with the container being hand portable and having openings in the container sidewall for an electrically-powered receptacle and a power supply connection;

a ground fault interrupter ("GFI") protective unit electrically connected with said receptacle to form an integral GFI/receptacle unit positioned for user access at said receptacle opening in said container sidewall;

a weathertight mounting means positioned at an upper location on the surface of said container and securing said GFI/receptacle unit to the container with a vertically-oriented GFI-protected plug-receiving face;

a first weathertight access covering over said receptacle face for protecting the GFI protective unit from moisture which may trip the GFI unit;

a three-cord, grounded electrical wire located within the container, said grounded wire having a fixed end electrically hard wired to said GFI/receptacle unit and a free end of said cord affixed with a grounded plug;

said wire being selected with a length suitable for establishing a connection beyond the interior of said container through said power supply opening to said external power source in order to supply GFI-protected grounded power at said GFI/receptacle unit when said wire is plugged into an external source; and another weathertight access covering over said power supply opening for weathertight access of said established connection through said power supply opening.

2. A weathertight intermediate protective unit in accordance with claim 1 wherein said first weathertight covering further comprises:

a weathertight lid selectively covering/exposing said receptacle face so that the receptacle can receive electrical plug(s) for powering GFI-protected tool(s) at the site of said container.

3. A weathertight intermediate protective unit in accordance with claim 1 wherein said hand portable container further comprises:

an opening at the container top with sufficient width across the opening for allowing user access for tools and the like into and out of the normally essentially empty interior of the side-walled container; and an open/close weathertight lid covering said top opening of said container.

4. A weathertight intermediate protective unit in accordance with claim 3 wherein said container additionally includes a storable light, and said container further comprises:

a light and light pole assembly which may easily be assembled/disassembled for user storage in said container when said light is not in use and extending above a central opening in said container lid when said light is in use;

attachment means securing said light pole centrally to the interior bottom wall of said container for additional stability when said light is in use; and means for energizing said light from said GFI/receptacle unit of said container.

5. A weathertight intermediate protective unit in accordance with claim 4 wherein said container further comprises:

a horizontal bottom wall of said container;

pedestal means for fastening said light pole attachment means to said interior bottom wall of said container; and weathertight means for sealing said light pole at the lid opening.

6. A weathertight intermediate protective unit in accordance with claim 5 wherein said light pole is detachable, sectioned, and storable, and said container further comprises:

two or more sections of rigid plastic pipe or other structurally suitable tubing connectable to each other for forming said light pole from said sections; and means for attaching a lower section of said tubing to said pole attachment means in said bottom wall of said container.

7. A weathertight intermediate protective unit in accordance with claim 4 wherein said light pole further comprises:

a plurality of light pole sections each adapted for connection to another light pole section; and means for securing said sections together in order to form said light pole.

8. A weathertight intermediate protective unit in accordance with claim 7 wherein said light pole further comprises:

a length of plastic pipe for each of said sections, with said length selected to allow said sections to fit within said container when said sections are detached from each other.

9. A weathertight intermediate protective unit in accordance with claim 8 wherein said plastic light pole sections tend to bind when assembled/disassembled by hand by a user, and further comprising:

male and female mated threads at each end of said sections forming said light pole; and anti-seize O-rings positioned between each section of said light pole in order to overcome the tendency of said sections to bind together when assembled.

10. A weathertight intermediate protective unit in accordance with claim 7 and further comprising:

a light fixture clamping means mounted to the uppermost end of said light pole section.

11. A weathertight intermediate protective unit in accordance with claim 10 and further comprising:

a light fixture held by said clamping means; and said light fixture energizable by an electrical-plug and wire running from said GFI/receptacle to said light fixture.

12. A weathertight intermediate protective unit in accordance with claim 4 and further comprising:

an opening in said lid sized to receive said light pole for attachment through said lid opening to said pole attachment means located in said bottom wall of said container; and a removable, replaceable centrally located plug for forming a weathertight seal at said opening in said weathertight lid when said light is not in use.

13. A weathertight intermediate protective unit in accordance with claim 1 wherein said mounting means further comprises:

a weathertight receptacle housing box closed on three sides and surrounding said integral GFI/receptacle unit with said housing box being mounted on the exterior of said container and said receptacle housing box further having an open side for user-access exposure of said receptacle face at said open side of said housing box.

14. A weathertight intermediate protective unit in accordance with claim 13 wherein said weathertight receptacle housing box further comprises:

a hinge connecting said first weathertight covering over said open side of said receptacle housing box with said hinge allowing a user to selectively cover or expose said receptacle face and receive electrical plugs for supplying GFI-protected power to electrical equipment at the intermediate site.

15. A weathertight intermediate protective unit in accordance with claim 14 wherein said weathertight covering over said receptacle face is further characterized by comprising:

a weathertight fit between the hinged cover and the receptacle box housing for sealing the lid in a weathertight seal over said GFI/receptacle face against rain and incidental water reaching said GFI/receptacle.

16. A weathertight intermediate protective unit in accordance with claim 14 wherein said hand held container further comprises:

a handle mounted in handle mounting means near the top opening of said container;

positioning means for locating said GFI/receptacle unit in line and directly below said mounting means for said handle; and screws holding said positioning means in a near vertical position below said handle mounting means.

17. A weathertight intermediate protective unit in accordance with claim 1 wherein said container further comprises:

a weathertight wire-sized opening through the side-wall of said container for conduiting the hard wired end of said electrical wire from an electrical connection at the GFI/receptacle unit to the interior of the container; and wire anchoring means securing said electrical wire to said container side-wall.

18. A weathertight intermediate protective unit in accordance with claim 17 wherein said container has an interior and an exterior side-wall surface and said container further comprises:

a wire-sized conduit elbow feed secured in said wire-sized opening through the side-wall for providing a conduit for said hard wired end of said electrical wire from the interior of said container to said GFI/receptacle unit.

19. A weathertight intermediate protective unit in accordance with claim 18 wherein said wire anchoring means further comprises:

means fixably securing said electrical wire in said elbow feed conduit.

20. A weathertight intermediate protective unit in accordance with claim 19 wherein said container further comprises:

means fixably connecting said elbow feed conduit directly to a rear face of the GFI/receptacle unit.

21. A weathertight intermediate protective unit in accordance with claim 17 wherein said container has an interior and an exterior side-wall surface and said container further comprises:

a wire-sized conduit elbow feed means located on the interior of the container for securing said wire in said wire-sized opening; and an exterior elbow feed box connected between said opening and the GFI/receptacle unit for feeding said wire from the elbow feed to said GFI/receptacle unit.

22. A weathertight intermediate protective unit in accordance with claim 21 wherein said container further comprises:

means fixably securing said interior elbow feed conduit means to said exterior elbow feed box.

23. A weathertight intermediate protective unit in accordance with claim 22 wherein said container further comprises:

means fixably connecting said exterior elbow feed conduit directly to a base of the GFI/receptacle unit.

24. A method of attaching and installing a portable light to a covered weathertight bucket-shaped container, said method comprising the steps of:

storing disassembled lights parts, including a detachable pole light in said bucket;

removing the light parts from the bucket;

assembling the parts into a pole light fixture with an upper and lower pole end;

mounting a light at the upper end of said pole;

covering the top of said bucket with a removable, replaceable weathertight lid having a central opening in said lid, for sealably housing a light pole erected through said lid opening;

erecting the pole light through said central opening in said lid;

securing a lower end of the pole to a horizontal bottom wall of said bucket-shaped container; and providing power for said light from a GFI/receptacle unit mounted on the bucket container.

25. A method of providing safety to electrical power users at an intermediate site by a combination side-walled and electrical shock protective unit, with the method comprising the steps of:

fixably mounting an integrated GFI/receptacle unit so that a tool may be plugged into a plug-receiving face of the receptacle exposed at the exterior surface of said protective unit;

sealing the exposed face of the receptacle in a weathertight seal on the exterior of the unit;

installing within the unit a length of electrical wire which has a first and a second end;

hard wiring the first end of said wire to the GFI/receptacle unit and leaving the second end loose in the unit interior;

running the second end of said wire through a weathertight opening in said unit to an external primary power source; and energizing said GFI/receptacle unit via current supplied to said protective unit from said primary power source.

26. A method in accordance with claim 25 and further providing repeatable access through a top opening to the interior of said side-walled protective unit, said method comprising the additional steps of:

securing a threaded ring permanently to a rim located at the top opening of the unit; and providing a weathertight lid with mating threads compatible with the threads of the permanently attached ring.

27. A weathertight intermediate protective unit in combination with a user-installed sectional pole light, said combination comprising:

a portable, side-walled, essentially empty pail capable of carrying tools, power cords and other loose articles as required at job sites, with the pail being hand portable and having weathertight coverings over a top opening, an electrical receptacle located on the side wall of the pail and a power supply opening through a wall of said pail;

a weathertight protective ground fault interrupter ("GFI") unit electrically connected with said electrical receptacle to form an integral GFI/receptacle unit;

a grounded electrical wire located within the pail, said grounded wire having a fixed end electrically hard wired to said GFI/receptacle unit and a free end of said cord affixed with a plug for connection through said weathertight power supply opening to an external power source;

a sectional light pole with section lengths storable within said pail in a disassembled condition; and a weathertight opening in the center of a pail lid covering said top opening in said pail, which central opening allows a sectional light pole to be secured to the interior bottom base of said pail through said top covering when said sectional pole is assembled.

28. An intermediate protective system for supplying power at job sites, said system comprising:

a hand portable weathertight container for carrying tools, cords and the like to and from said job site;

means for receiving electrical power for said intermediate system through a power connection between said container and an external power source;

a protective ground fault interrupter ("GFI") unit integral with an electrical receptacle as a GFI/receptacle unit carried by said container and powered by the received electrical power, said GFI/receptacle unit falsely interrupting said power when triggered by moisture; and weathertight protective means for protecting said GFI/receptacle unit from moisture, thereby preventing said false triggering of said GFI/receptacle.

29. An intermediate protective system for supplying power at job sites in accordance with claim 28 and further comprising:

said container is a circular plastic pail with a handle; and a grounded electrical wire located within the pail, said grounded wire having a fixed end electrically hard wired to said GFI/receptacle unit and a free end of said cord affixed with a plug for connection through a weathertight opening in said pail.

30. An intermediate protective system for supplying power and a user-installed pole light at job sites in accordance with claim 29 and further comprising:

an open top, a bottom wall and a weathertight lid covering for said pail;

a sectional light pole with section lengths, in a disassembled condition, storable within said pail;

a central opening in the center of said pail lid for admitting therethrough an upright light pole assembled from said sectional lengths; and means securing said assembled light pole through said central opening in said lid top to the interior bottom wall of said pail.

* * * * *